United States Patent
Haase et al.

(10) Patent No.: US 10,089,316 B1
(45) Date of Patent: Oct. 2, 2018

(54) MANAGING MULTIPLE FILE SYSTEM EXPANSIONS

(71) Applicant: EMC Corporation, Hopkinton, MA (US)

(72) Inventors: David Haase, Fuquay Varina, NC (US); Michael C. Brundage, Cary, NC (US); Walter C. Forrester, Berkeley Heights, NJ (US); Paul T. McGrath, Raleigh, NC (US); Somnath A. Gulve, Morrisville, NC (US)

(73) Assignee: EMC IP Holding Company LLC, Hopkinton, MA (US)

(*) Notice: Subject to any disclaimer, the term of this patent is extended or adjusted under 35 U.S.C. 154(b) by 457 days.

(21) Appl. No.: 14/753,561

(22) Filed: Jun. 29, 2015

(51) Int. Cl.
*G06F 17/30* (2006.01)

(52) U.S. Cl.
CPC ...... *G06F 17/30144* (2013.01); *G06F 17/302* (2013.01); *G06F 17/30132* (2013.01)

(58) Field of Classification Search
USPC .................................. 707/821, 823
See application file for complete search history.

(56) References Cited

U.S. PATENT DOCUMENTS

| | | | |
|---|---|---|---|
| 7,031,988 B2 * | 4/2006 | Kusama | G06F 11/323 707/823 |
| 7,631,155 B1 | 12/2009 | Bono et al. | |
| 8,001,338 B2 * | 8/2011 | Moscibroda | G06F 13/1642 711/104 |
| 8,825,725 B2 * | 9/2014 | Watanabe | G06F 3/0608 707/823 |
| 8,850,156 B2 * | 9/2014 | Yang | G06F 9/45558 711/170 |
| 9,047,169 B1 | 6/2015 | Haase et al. | |
| 9,239,803 B2 | 1/2016 | Zhu et al. | |
| 9,253,105 B2 * | 2/2016 | Curcio | H04L 47/30 |
| 9,286,007 B1 | 3/2016 | Bono | |
| 9,400,619 B2 * | 7/2016 | Clifton | G06F 3/0605 |
| 9,454,532 B2 * | 9/2016 | Powell | G06F 17/30079 |
| 9,460,097 B2 * | 10/2016 | Powell | G06F 17/30233 |
| 9,678,980 B2 * | 6/2017 | Clifton | G06F 17/30174 |
| 9,940,332 B1 * | 4/2018 | Zhou | G06F 17/30091 |
| 2013/0086585 A1 | 4/2013 | Huang et al. | |

* cited by examiner

Primary Examiner — Kim Nguyen
(74) Attorney, Agent, or Firm — BainwoodHuang

(57) ABSTRACT

A technique for managing file system expansions includes receiving a request to perform a file system expansion, the request specifying or implying an increase in size of a file system to a new target size. The request is received while a previous file system expansion is already in progress. The technique includes merging the previous file system expansion into the file system expansion specified by the request, to increase the size of the file system to the new target size.

11 Claims, 5 Drawing Sheets

MANAGING MULTIPLE FILE SYSTEM EXPANSIONS

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Data storage systems often operate file systems, i.e., systems for organizing and managing files and directories on storage media. Such data storage systems may serve file systems as host-accessible objects, e.g., for use by clients, and/or may employ file systems for internal data management.

Data storage systems provision file systems with storage extents for persistently retaining file system data and metadata. Some file systems are "thickly" provisioned, meaning that a predetermined amount of storage space within a data storage system is reserved for the file system. Other file systems are "thinly" provisioned, meaning that a data storage system adds storage extents to the file system on demand, as the file system grows.

SUMMARY

Some data storage systems internally realize host file systems in the form of files, where a single file stores a complete realization of a host file system, including its data and metadata. The file realizing the host file system is itself part of an internal file system operating within the data storage system. In such arrangements, the host file system may be referred to as an "upper-deck" file system and the internal file system may be referred to as a "lower-deck" file system. A data storage system may prescribe thin provisioning for the upper-deck file system but thick provisioning for the lower-deck file system. As the upper-deck file system grows, e.g., in response to content being written to the upper-deck file system, the amount of data and metadata stored in the upper-deck file system may approach the limit of the underlying lower-deck file system. For instance, if the lower-deck file system is thickly provisioned with 100 GB of storage, the upper-deck file system may eventually grow to a point where its total size approaches 100 GB. When this happens, the data storage system may perform an automatic expansion on the lower-deck file system. For example, the data storage system may expand the size of the lower-deck file system to 200 GB. The upper-deck file system may then continue to grow, on demand, until its total size approaches 200 GB, at which point the data storage system may perform another automatic expansion.

Although expansions of lower-deck file systems may happen automatically, some data storage systems allow users, such as storage administrators, to explicitly expand a file system via user action. For example, a user may issue a command in an administrative program to expand a file system to a designated target size. In response to the command, the data storage system may perform an expansion, much as it would when it expands a file system automatically.

Unfortunately, conflicts can arise when a user issues an expansion command while an automatic file system expansion is already in progress. Such conflicts generally result in the data storage system failing the user expansion and proceeding with the automatic expansion until it completes. Completion of file system expansion commands can take several minutes, or longer. Similar conflicts may arise when a user (or multiple users) issue multiple expansion commands in succession. In such cases, any commands that arrive while another command is being processed may result in a failure. Such failures cause inconvenience to users, who may have to wait long periods of time for currently-running expansion operations to complete before they can resubmit their own expansion commands without failures.

In accordance with improvements hereof, a technique for managing file system expansions includes receiving a request to perform a file system expansion, the request specifying or implying an increase in size of a file system to a new target size. The request is received while a previous file system expansion is already in progress. The technique includes merging the previous file system expansion into the file system expansion specified by the request, to increase the size of the file system to the new target size.

Advantageously, the disclosed technique avoids failing later-arriving expansion requests when earlier requests are in progress. Users are thus generally able to submit their expansion requests and move on to other tasks, without having to wait to resubmit their requests until currently-running expansions complete. The improved technique may also have the effect of servicing later-arriving expansion requests sooner than would otherwise be possible, as merged expansion requests often take less time to complete than individual, consecutive requests.

Certain embodiments are directed to a method of managing multiple file system expansion operations in a data storage system. The method includes operating a processing entity in the data storage system to perform a first expansion operation on a file system, the first expansion operation specifying an increase in a size of the file system to a first target size. While the processing entity is performing the first expansion operation, the method further includes receiving a request to perform a second expansion operation to increase the size of the file system to a second target size. The method still further includes checking, by the processing entity, for a new target size prior to its completing the first expansion operation and merging the first expansion operation into the second expansion operation by increasing the size of the file system to the second target size in response to the processing entity finding a new target size when checking for the new target size.

Other embodiments are directed to a data storage system constructed and arranged to perform a method of managing multiple file system expansion operations in a data storage system, such as the method described above. Still other embodiments are directed to a computer program product. The computer program product stores instructions which, when executed by control circuitry of a data storage system, cause the control circuitry to perform a method of managing multiple file system expansion operations in a data storage system, such as the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing file system expansions includes receiving a request to perform a file system expansion, the request specifying or implying an increase in size of a file system to a new target size. The request is received while a previous file system expansion is already in progress. The technique includes merging the previous file system expansion into the file system expansion specified by the request, to increase the size of the file system to the new target size.

Figure 1:
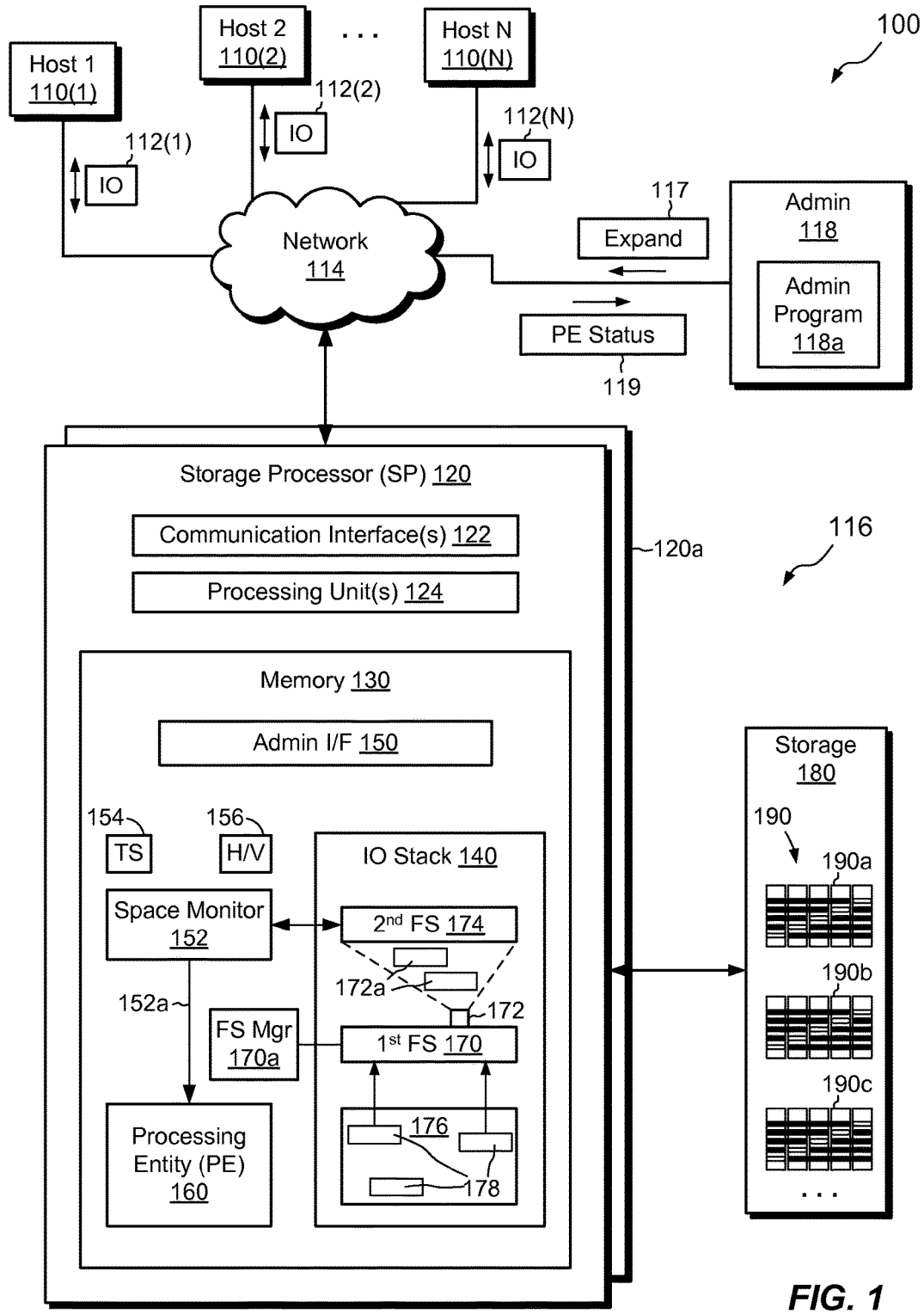
FIG. 1 is a block diagram of an example environment in which the disclosed technique hereof can be practiced.

FIG. 1 shows an example environment 100 in which embodiments of the improved technique hereof can be practiced. Here, multiple host computing devices ("hosts"), shown as devices 110(1) through 110(N), as well as an administrative machine 118, access a data storage system 116 over a network 114. The data storage system 116 includes a storage processor, or "SP," 120 and storage 180. The data storage system 116 may include multiple SPs like the SP 120 (e.g., a second SP, 120a). It is understood that any number of SPs, may be provided, including a single SP, and the SP 120 can be any type of computing device capable of processing host IOs.

In an example, the storage 180 includes RAID groups 190a, 190b, and 190c (collectively, 190), where each RAID group is composed of multiple disk drives. The disk drives may include magnetic disk drives, electronic flash drives, optical drives, and/or other types of drives. In a typical example, each of the RAID groups 190 includes disk drives of a common type that provide similar performance.

The network 114 can be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols. As is known, Fibre Channel and iSCSI are block-based protocols, whereas NFS, SMB 3.0, and CIFS are file-based protocols. The SP 120 is configured to receive IO requests 112(1-N) according to block-based and/or file-based protocols and to respond to such IO requests 112(1-N) by reading and/or writing the storage 180. Although the data storage system 116 is capable of receiving and processing both block-based requests and file-based requests, it should be understood that the invention hereof is not limited to data storage systems that can do both.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 includes (i.e., realizes by operation of programming code) an IO stack 140, an administrative interface 150, a space monitor 152, a target size (TS) value 154, a hidden/visible (H/V) flag 156, and a processing entity 160. The TS value 154 and H/V flag 156 may each be provided in one or more memory registers, buffers, caches, and/or in any other memory construct, for example. The processing entity 160 may be provided as a program or other software construct, which is capable of executing multiple processing steps.

The IO stack 140 provides an execution path for host IOs (e.g., IO requests 112(1-N)). Here, it is seen that the IO stack 140 includes a storage pool 176, which manages multiple storage extents 178. The IO stack 140 also includes a first file system 170. The first file system 170 stores a file 172. A second file system 174 is realized within the file 172. For example, all the data and metadata of the second file system 174 are stored within the file 172. The first file system 170 is thus a lower-deck file system, which may be thickly provisioned (i.e., fully reserved), and the second file system 174 is an upper-deck file system, which may be thinly provisioned (i.e., populated with storage on demand). It should be understood that the pool 176, first file system 170, file 172, and second file system 174 are logical constructs within the IO stack 140, and that persistent data and metadata of these logical constructs may be stored in the storage 180.

In example operation, the data storage system 116 exposes the second file system 174 to hosts 110(1-N), which submit IO requests 112(1-N) specifying data to be written to and/or read from specified files and/or directories of the second file system 174, e.g., using NFS, CIFS, or SMB 3.0, for example. Because the second file system 174 is thinly provisioned, it grows in response to demand for storage from incoming IO requests 112(1-N). The data storage system 116 reserves an initial amount of storage for the first file system 170. If the initial amount of storage is 100 GB and each of the storage extents 178 is 1 GB in size, for example, the data storage system 116 may initially provision 100 storage extents 178 to the first file system 170. Depending on whether the first file system 170 stores other files, and the size of any such files, most of the 100 GB of provisioned space may be available to the file 172. In a typical arrangement, the file 172 may be the only file within the first file system 170. In some examples, though, the first file system 170 may also include snaps of the file 172. The second file system 174 uses the 100 GB (or a portion thereof) as needed to support storage demands. For example, the data storage system 116 expresses the file 172 as a volume, divides the volume into storage extents 172a and provisions the storage extents 172a to the second file system 174 as needed.

As the second file system 174 grows, e.g., in response to writes from hosts 110(1-N), the size of the second file system 174 may start to approach the total amount of storage available to the file 172, e.g., approximately 100 GB in this example. The space monitor 152 tracks storage usage of the second file system 174. When the storage usage of the second file system 174 begins to approach the limits of the file 172, the space monitor 152 sends a request 152a to perform an auto-expansion. In an example, the request 152a specifies a new target size (TS) for the first file system 170, which is stored as the TS value 154.

In response to the request 152a, the data storage system 116 may instantiate the processing entity (PO) 160, assuming it is not running already. Once running, the PE 160 sets the H/V flag 156 to "Hidden." This setting keeps the operation of the PE 160 hidden from the administrative program 118a. For example, in this hidden mode, the PE 160 ignores polling from the administrative program 118a (or other communication attempts) and does not provide status or control information to the administrative program 118a. While operating in this hidden mode, the PE 160 sends a command to a manager 170a of the first file system 170 to request an increase in the size of the first file system 170 to the target size specified in TS value 154. The manager 170a then directs provisioning of one or more free storage extents 178 from the pool 176 into the first file system 170 and, in some cases, builds metadata to support expansion of the file 172. Once this processing is complete, the PE 160 communicates the size change to other portion of the IO stack 140, which recognizes the new size and allow the second file system 174 to continue growing, e.g., by provisioning storage from new extents 172a on demand. Last, the PE 160 performs a self-destruction operation, to remove itself from memory 130. Auto-expansions such as this may be carried out numerous times over the lifecycle of the second file system 174, as the second file system continues to grow based on client demand.

At any point during the service life of the second file system 174, a user of the data storage system 116, such as an administrator, may operate the administrative program 118a to view or change settings of the first file system 170 and/or the second file system 174. If the administrator observes that available space is running low, for example, the administrator may issue an expand request 117. The expand request 117 specifies or implies a new target size for the first file system 170.

The data storage system 116 receives the user-initiated expand request 117 and stores the new target size for the first file system 170 (specified or implied by the request 117) in the TS value 154. If the PE 160 is not running already, the data storage system 116 instantiates the PE 160. The PE 160 recognizes the expand request 117 as a user-initiated request and sets the H/V flag 156 to "Visible." In this visible mode, the PE 160 responds to polling or other communication attempts by the administrative program 118a and returns, upon request, status information 119 pertaining to operation of the PE 160. The PE 160 then performs the requested expansion in a manner similar to that described above, i.e., by directing the manager 170a of the first file system 170 to provision new extents 178 to the first file system 170 and, if necessary, by building new metadata to support expansion of the file 172. Once expansion is complete, the PE 160 responds to polling from the administrative program 118a and informs the administrative program 118a of the completed status, whereupon the administrative program 118a directs destruction of the PE 160. The data storage system 116 then destroys the PE 160 in response to an instruction from the administrative program 118a.

It should be understood that user-initiated expansions may be express or implied. For example, a user may operate the administrative program 118a to directly request an express expansion of the first file system 170 to a new target size. However, the user may alternatively request expansion of the second file system 174 to a new desired size, in which case expansion of the first file system 170 would be implied. If this occurs, the data storage system 116 may compute a new target size for the first file system 170 based on the received desired size for the second file system 174 (and known configuration information about their relationship) and issue an internal request to expand the first file system 170 to the newly computed target size. Also, expansion requests may be implied from other types of requests received from users. For instance, a user may operate the administrative program 118a to request conversion of the second file system 174 from a thin file system (as in the example above) to a thick file system of a specified size. This conversion entails an expansion of the first file system 170 to a new size based on the specified size of the second file system 174 and thus entails a user-initiated expansion operation. In an example, the data storage system 116 handles all such user-initiated expansions in the manner described above.

Given that automatic expansions and user expansions may be initiated independently, it is possible for a user to submit a request 117 for a user-initiated expansion of the first file system 170 to a new target size while the data storage system 116 is already in the act of performing an automatically-initiated expansion on the file system 170. In such cases, rather than failing the request 117, the data storage system 116 merges the ongoing automatically-initiated expansion into the requested user expansion and expands the first file system 170 to the new target size specified or implied by the user request 117.

For example, upon receiving the request 117, the data storage system 116 stores the new target size specified or implied by the user request 117 in the TS value 154. The PE 160, which is already running, checks for a new TS value 154 before completing the auto-expansion, e.g., before destroying itself. The PE 160 finds the new TS value 154, and proceeds to merge the auto-expansion into the user expansion. The PE 160 flips the H/V flag 156 from Hidden to Visible and thus transitions from hidden mode to visible mode. The PE 160 then proceeds to expand the first file system 170 to the new target size specified in the updated TS value 154, i.e., the target size specified or implied by the user request 117. Upon completion of the expansion, the PE 160 responds to polling from the administrative program 118*a* to inform the administrative program 118*a* that the user expansion is complete. The PE 160 then allows itself to be destroyed by the administrative program 118*a*, as described above.

Given that users can submit multiple user-initiated expansion requests, it is also possible that a user can submit a new user-initiated request 117 while a previous user-initiated request is still being serviced. In these circumstances, the previous user-initiated request is merged into the new user-initiated request and the first file system 170 is expanded to the target size specified or implied by the new user-initiated request. For example, the data storage system 116 receives the new user-initiated request 117 and stores the new target size in the TS value 154. The PE 160 checks the TS value 154 before completing the previous user expansion, and upon finding an updated value, performs the expansion to the new target size stored in the TS value 154. As the PE 160 is already operating in visible mode, no change to the H/V flag 156 is needed. In an example, the PE 160 defers informing the administrative program 118*a* of completion until expansion to the target size specified or implied by the new request is complete. Only then does the PE 160 allow itself to be destroyed. It should be understood that the PE 160 allows itself to be destroyed only when no expansion is actively in progress. For example, if a third user-initiated expansion request 117 arrived after the previous ones where merged, destruction of the PE 160 would again be deferred until expansion to the target size specified or implied by the third request was completed.

It is thus evident that the disclosed technique avoids failing new expansion requests that arrive when earlier expansion requests are still in progress. Rather, the disclosed technique merges older requests into newer requests and expands the size of the first file system 170 to the target sizes specified or implied by the newer requests. Consequently, the data storage system 116 operates more efficiently and administrators enjoy greater convenience.

Figure 2:
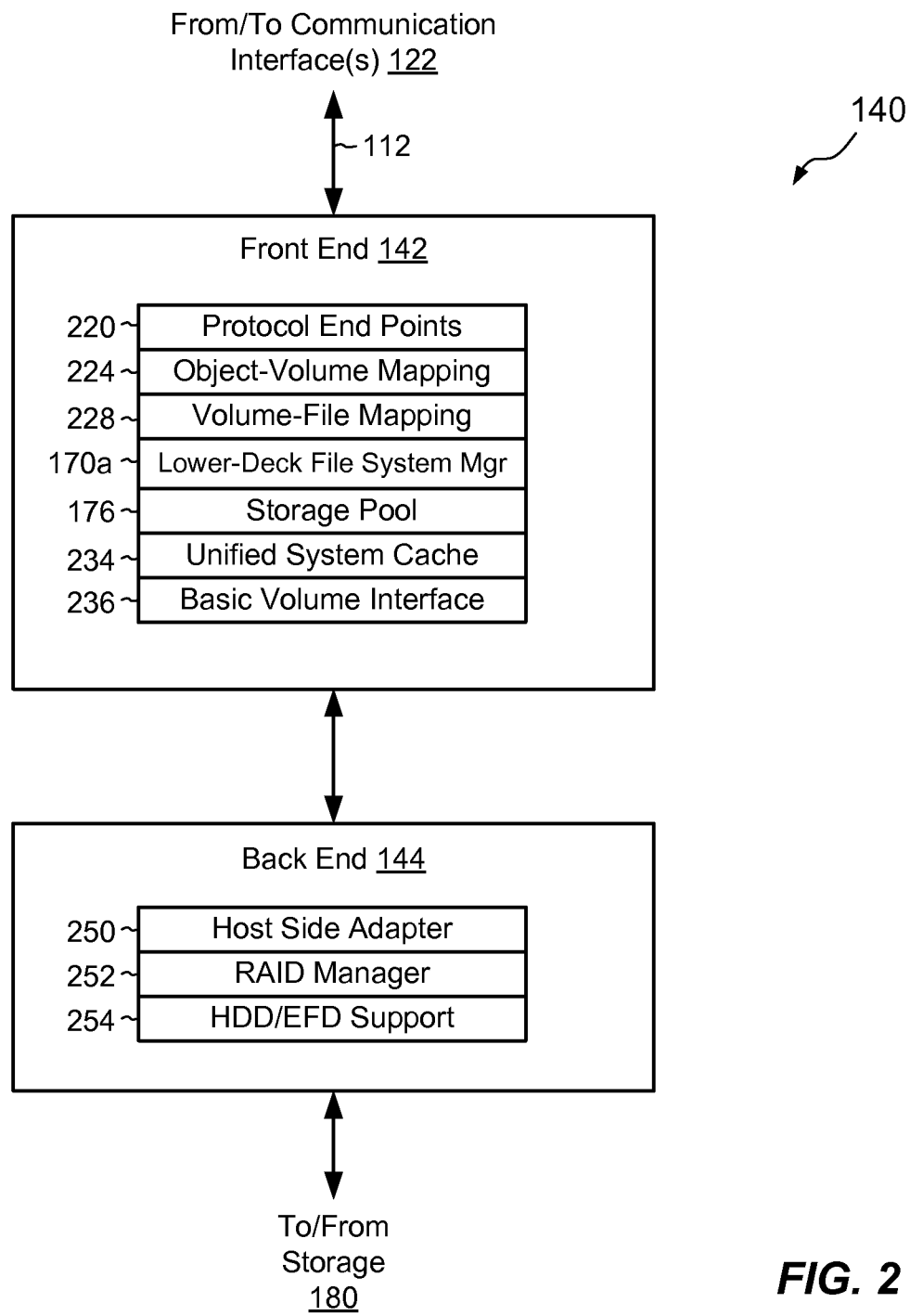
FIG. 2 is a block diagram of an example IO stack of FIG. 1 in additional detail.

FIG. 2 shows additional features of the example IO stack 140 of FIG. 1 in additional detail. The inclusion of FIG. 2 herein is intended to provide additional example context for the improvements disclosed.

As shown in FIG. 2, the IO stack 140 includes a front end 142 and a back end 144. The front end 142 and back end 144 may be operated together on the same SP, or may be operated on different SPs, e.g., in a modular arrangement. Further, the front end 142 may be connected directly to a separate block-based array, e.g., in a gateway arrangement, with back-end functionality provided by the block-based array.

The front end 142 is seen to include, from top to bottom, protocol end points 220, an object-volume mapping layer 224, a volume-file mapping 228, a lower-deck (internal) file system manager 170*a*, a storage pool 176, the unified system cache 234, and a basic volume interface 236.

The back end 144 is seen to include a host side adapter 250, a RAID manager 252, and hard disk drive/electronic flash drive support 254. Although IO requests 112 enter the IO stack 140 from the top and propagate down (from the perspective of FIG. 2), the components of the IO stack 140 are described herein from the bottom to the top to promote ease of understanding.

At the back end 144, the hard disk drive/electronic flash drive support 254 includes drivers that perform the actual reading from and writing to the magnetic disk drives, electronic flash drives, etc., in the storage 180. The RAID manager 252 arranges the storage media into RAID groups 190 and provides access to the RAID groups 190 using RAID protocols. The RAID manager 252 also expresses RAID groups 190 in the form of internal LUNs (not shown). The host side adapter 250 provides an interface to the front end 142, for implementations in which the front end 142 and back end 144 run on different machines or SPs. When the front end 142 and back end 144 are co-located on the same SP, as they are in FIG. 1, the host side adapter 250 may be omitted or disabled.

Continuing to the front end 142, the basic volume interface 236 provides an interface to the back end 144 for instances in which the front end 142 and back end 144 are run on different machines or SPs. The basic volume interface 236 may be disabled in the arrangement shown in FIG. 1.

The unified system cache 234 provides data caching services. For example, the unified system cache 234 caches data written from IO requests 112 to the first file system 170 and to the second file system 174.

The storage pool 176 organizes elements of the storage 180 in the form of storage extents 178. In an example, the storage extents 178 are provided in the form of slices. A "slice" is an increment of storage space, such as 256 MB or 1 GB in size, which is composed from a portion of an internal LUN. The pool 176 may allocate slices to lower-deck file systems to support the storage of data objects. The pool 176 may also deallocate slices from lower-deck file systems if storage provided by the slices is no longer required.

The lower-deck file system manager 170*a* builds and manages internal, lower-deck file systems (like file system 170) upon slices served by the storage pool 176. In some examples, lower-deck file systems can realize both block-based objects and file-based objects in the form of files, like the file 172 (FIG. 1). The data storage system 116 may include any number of lower-deck file systems, and each lower-deck file system may include any number of files. In a typical arrangement, a different lower-deck file system is provided for each data object to be stored. Each lower-deck file system includes one file that realizes the data object itself and, in some instances, include other files that realize snaps of the file that stores the data object. Some implementations allow for storing additional files. Each lower-deck file system has an inode table. The inode table provides a different inode for each file stored in the respective lower-deck file system. Each inode stores properties of a respective file, such as its ownership and size, and includes information for accessing the file's data.

The volume-file mapping 228 maps each file realizing a data object to a respective internal volume (or LUN). Higher levels of the IO stack 140 can then access the internal volume using block-based semantics. The volume-file mapping can be achieved in a variety of ways. According to one example, a file realizing a data object is regarded as a range of blocks, and the range of blocks is expressed as a corresponding range of offsets into the file. Because volumes are accessed based on identifier (logical unit number) and offset, the volume-file mapping 228 can establish a one-to-one correspondence between logical offsets into a file and physical offsets into the corresponding internal volume, thus providing the requisite translation needed to express the file in the form of a volume.

The object-volume mapping layer 224 maps internal volumes to respective data objects accessible to hosts, such as host LUNs, host file systems, and VVols, for example. For host file systems, object-volume mapping may be accomplished in part by leveraging from the fact that file systems are customarily built upon volumes, such that an underlying volume is part of the structure of any host file system. Host file systems, also called "upper-deck file systems," are thus built upon the internal volumes presented by the volume-file mapping 228.

The protocol end points 220 expose the underlying data objects to hosts in accordance with respective protocols for accessing the data objects. Thus, the protocol end points 220 may expose block-based objects (e.g., LUNs and block-based VVols) using Fiber Channel or iSCSI and may expose file-based objects (e.g., host file systems and file-based VVols) using NFS, CIFS, or SMB 3.0, for example.

Figure 3:
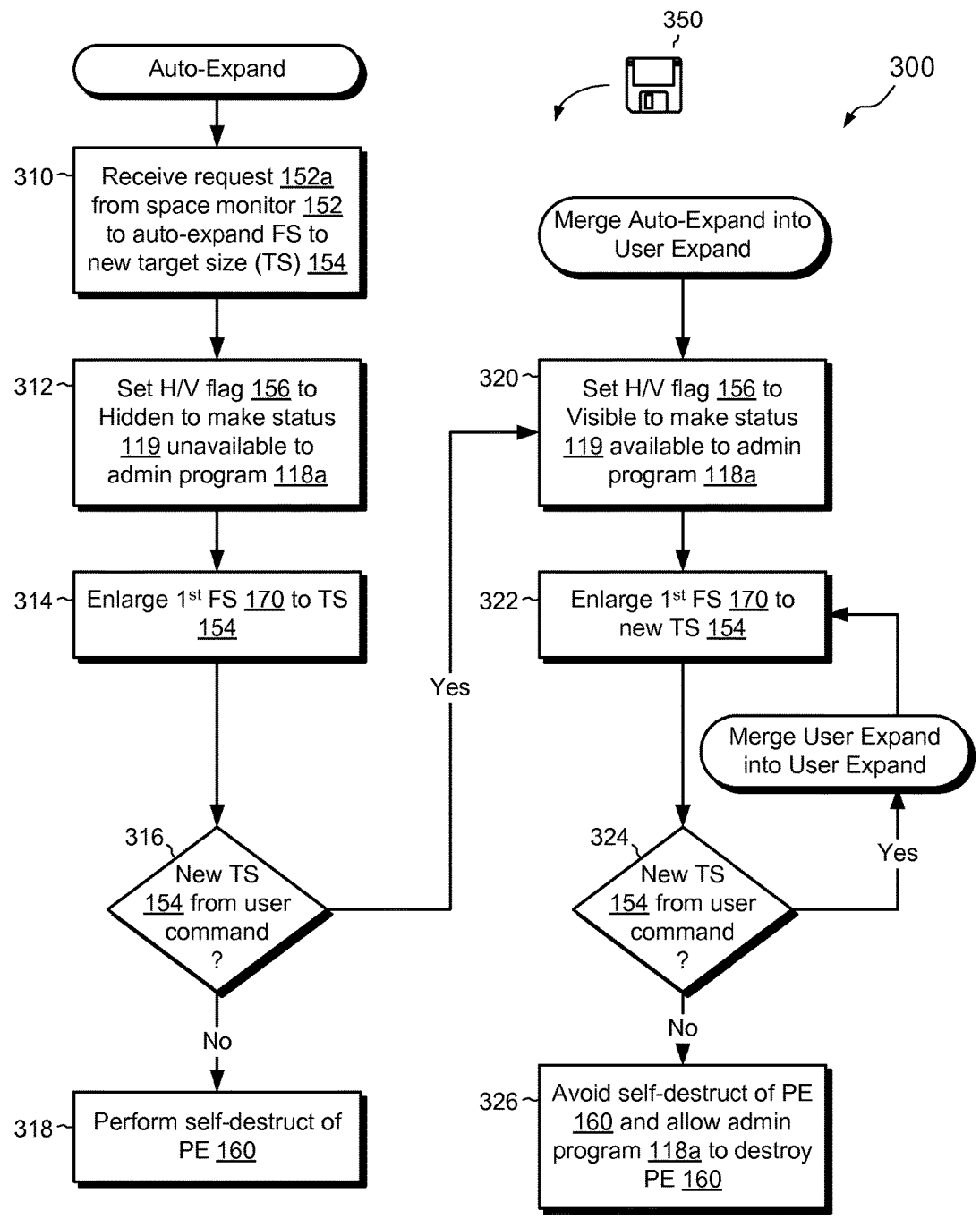
FIG. 3 is a flowchart showing an example process for responding to one or more file system expansion requests.

FIG. 3 shows an example process 300 for expanding a file system, such as the first file system 170. The process 300 includes an auto-expansion portion, shown at left in acts 310, 312, 314, 316, and 318, and a merging portion, shown at right in acts 320, 322, 324, and 326. The acts of the process 300 may be carried out, for example, by the software constructs shown in FIGS. 1 and 2, e.g., by the set of processors 124 executing instructions in the memory 130.

Turning first to the auto-expansion portion at left, at 310 it is seen that a request 152a is received from the size monitor 152 to expand the file system 170 to a new target size. The request 152a stores the new target size in TS value 154. In response to the request 152a, the data storage system 116 may instantiate the PE 160, assuming it is not already running.

At 312, the PE 160 sets the H/V flag 156 to Hidden to make PE status 119 unavailable to the administrative program 118a. In hidden mode, the PE 160 ignores polling from the administrative program 118a.

At 314, the PE 160 sends a request to the manager 170a of the first file system 170 to enlarge the file system 170 to the new TS value 154 and, if necessary, to build new metadata to support expansion of the file 172. The manager 170a of the first file system 170 completes the expansion.

At 316, the PE 160 checks whether a new TS value 154 has been received, e.g., in response to a newly arriving user-initiated expansion request 117. If not, operation proceeds to 318, whereupon the PE 160 destroys itself and removes itself from memory 130.

If the checking at 316 indicates that a new TS value 154 has been received, however, operation proceeds instead to 320, whereupon the auto-expand operation is merged into the recently-arrived user-initiated expansion.

At 320, the PE 160, which is already running to perform the auto-expansion, switches the H/V flag 156 to Visible, and the PE 160 proceeds to operate in visible mode, in which it responds to polling or other status inquiries from the administrative program 118a.

At 322, the PE 160 sends a request to the manager 170a of the first file system 170 to enlarge the first file system 170 to the new TS value 154 from the request 117 and, if necessary, to build new metadata to support expansion of the file 172. The manager 170a of the first file system 170 completes the expansion.

At 324, the PE 160 checks whether a new TS value 154 has been received, e.g., from a second user-initiated expansion request 117. If not, operation proceeds to 326, whereupon the PE 160 reports completion status 119 to the administrative program 118a and allows itself to be destroyed by the administrative program 118a.

If the checking at 324 indicates that a new TS value 154 has been received, however (i.e., from a new user expansion request), operation instead loops back to 322, whereupon the original user-initiated expansion is merged into the second one. The first file system 170 is again enlarged. Then, checking again is performed for yet another change in target size (at 324). The PE 160 continues to operate in this loop until no further changes in TS value 154 are found. At this point, operation proceeds to 326, whereupon the PE 160 allows itself to be destroyed at the direction of the administrative program 118a.

It should be noted that the acts shown at the right in FIGS. 3 (320, 322, 324, and 326) may be performed independently of the acts shown at left (310, 312, 314, 316, and 318), i.e., in the absence of any automatically-initiated expansion. For instance, the acts shown at right for user-initiated expansions may be performed even if no automatically-initiated expansion was initially in progress.

Figure 4:
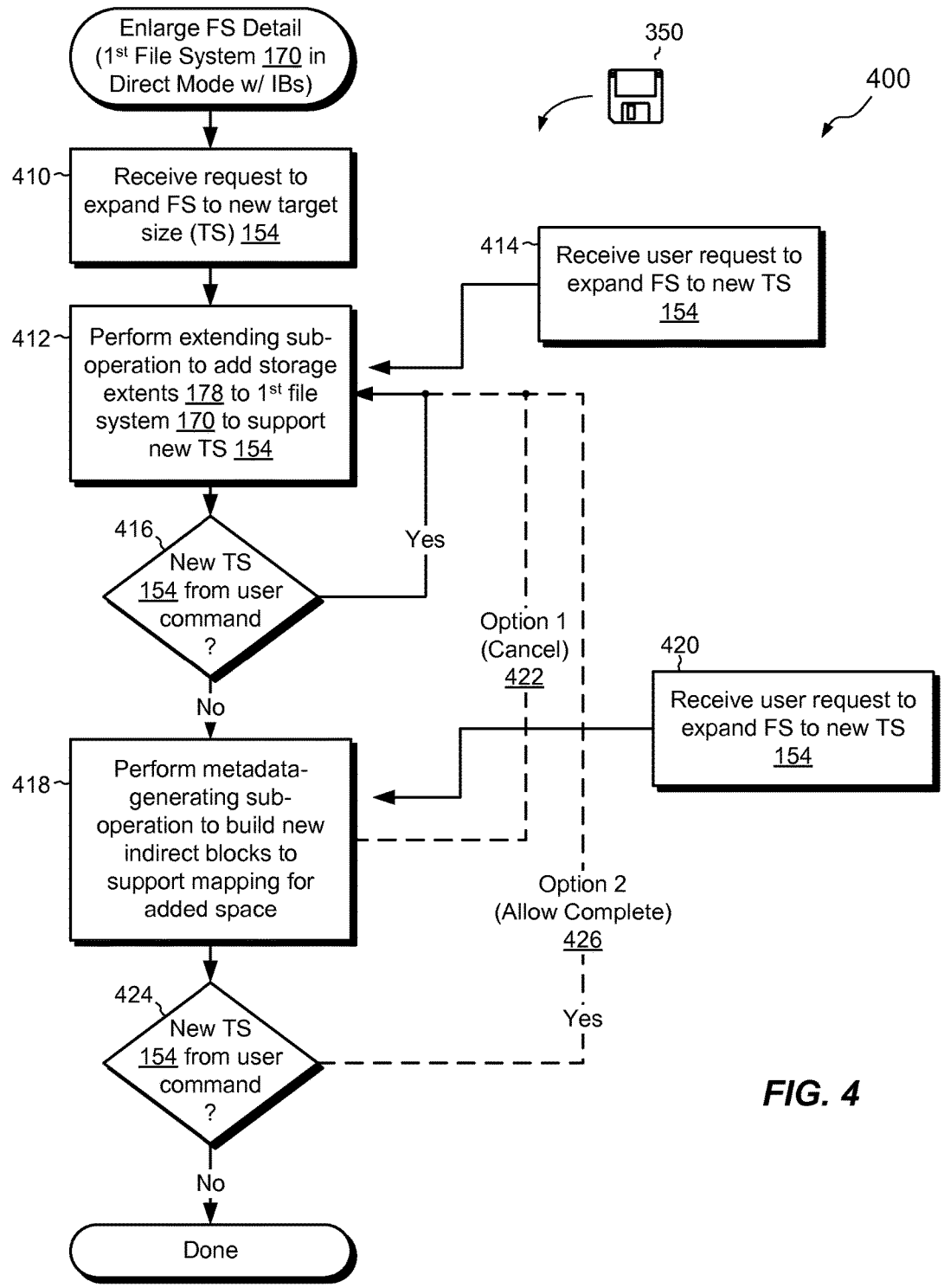
FIG. 4 is a flowchart showing an example process for enlarging a file system in greater detail.

FIG. 4 shows an example process 400 for enlarging the first file system 170. The process 400 provides a more detailed example of the acts 314 and 322 of FIG. 3 and applies only in the case where the first file system 170 operates the file 172 in direct mode but has provided metadata, e.g., in the form of indirect blocks, for addressing the file 172 in the event that the file 172 switches from direct mode to mapped mode, e.g., when a snap is taken of file 172.

As is known, direct mode is a highly efficient way to access contents of a file by applying a predetermined mathematical relationship that translates logical addresses of the file into corresponding physical addresses of the underlying file system. Direct mode can only be applied to files whose layouts in physical address space conform to the mathematical relationship. In contrast, mapped mode does not require that file layout conform to the mathematical relationship. Rather, mapped mode involves accessing indirect blocks that associate logical addresses of the file with corresponding physical addresses in the file system. The process 400 is applicable in the case where the file 172 is operated in direct mode, but where a complete indirect block tree is prepared and ready to be deployed in the event that the data storage system 116 takes a snap of file 172.

At 410, a request is received to expand the first file system 170 to a new target size. The request may take the form of an auto-expand request 152a or of a user-initiated request 117. The data storage system 116 stores the target size in the TS value 154.

At 412, the PE 160 begins expanding the first file system 170 by directing the manager 170a of the first file system 170 to perform an extending sub-operation. The extending sub-operation adds new storage extents 178 to the first file system 170 to support the new TS value 154. The manager 170a can generally perform the extending sub-operation quickly. Thus, if a new user-initiated expansion request arrives (at 414) while the extending sub-operation is already in progress, the PE 160 generally allows the extending sub-operation to run to completion.

At 416, the PE 160 checks whether a new TS value 154 has been stored. If one has, as in 414, PE 160 returns to 412 and performs the extending sub-operation again, this time extending the file system 170 to support the target value 154 provided by the new user request received at 414. Operation will continue in this loop until no new TS value 154 is received, whereupon operation proceeds to 418.

At 418, the PE 160 directs the manager 170a to perform a metadata-generating sub-operation. The metadata-generating sub-operation builds new indirect blocks for the file 172 to support the newly extended space. Unlike the extending sub-operation, which generally completes quickly, the metadata-generating sub-operation can take considerably more time. If a new user-initiated request 117 arrives while the metadata-generating sub-operation is in progress (at 420), the PE 160 may proceed according to one of two options.

According to a first option 422, the PE 160 cancels the running metadata-generating sub-operation and returns control to 412, whereupon a new extending sub-operation is performed to extend the file system 170 to the target size specified or implied by the new user initiated request 117 (from 420). Assuming no additional expansion requests arrive, a new metadata-generating sub-operation is performed (at 418).

According to a second option 424, the PE 160 allows the running metadata-generating sub-operation at 418 to complete. The PE 160 checks for a new TS value 154 at 424, and upon finding a new TS value 154, returns operation to 412. The process 400 resumes from there.

In an example, the PE 160 selects between the first option 422 and the second option 424 based upon how much farther the metadata-generating sub-operation at 418 must go before it runs to completion. In another example, the PE 160 selects between the first option 422 and the second option 424 based upon particulars of the metadata-generating sub-operation. For instance, if the metadata-generating sub-operation must always run from beginning to end of the file system 170 and cannot run incrementally, then it may be less time-consuming to cancel the metadata-generating sub-operation, as the metadata it has built so far will just have to be rebuilt again later when processing the new expansion request. However, if the metadata-generating sub-operation can run incrementally, e.g., based on a range of logical addresses added to the file 172, then it may be more efficient to allow the metadata-generating sub-operation to run to completion, as the metadata it builds will not have to be rebuilt later but rather will be built upon incrementally when processing the new expansion request.

Figure 5:
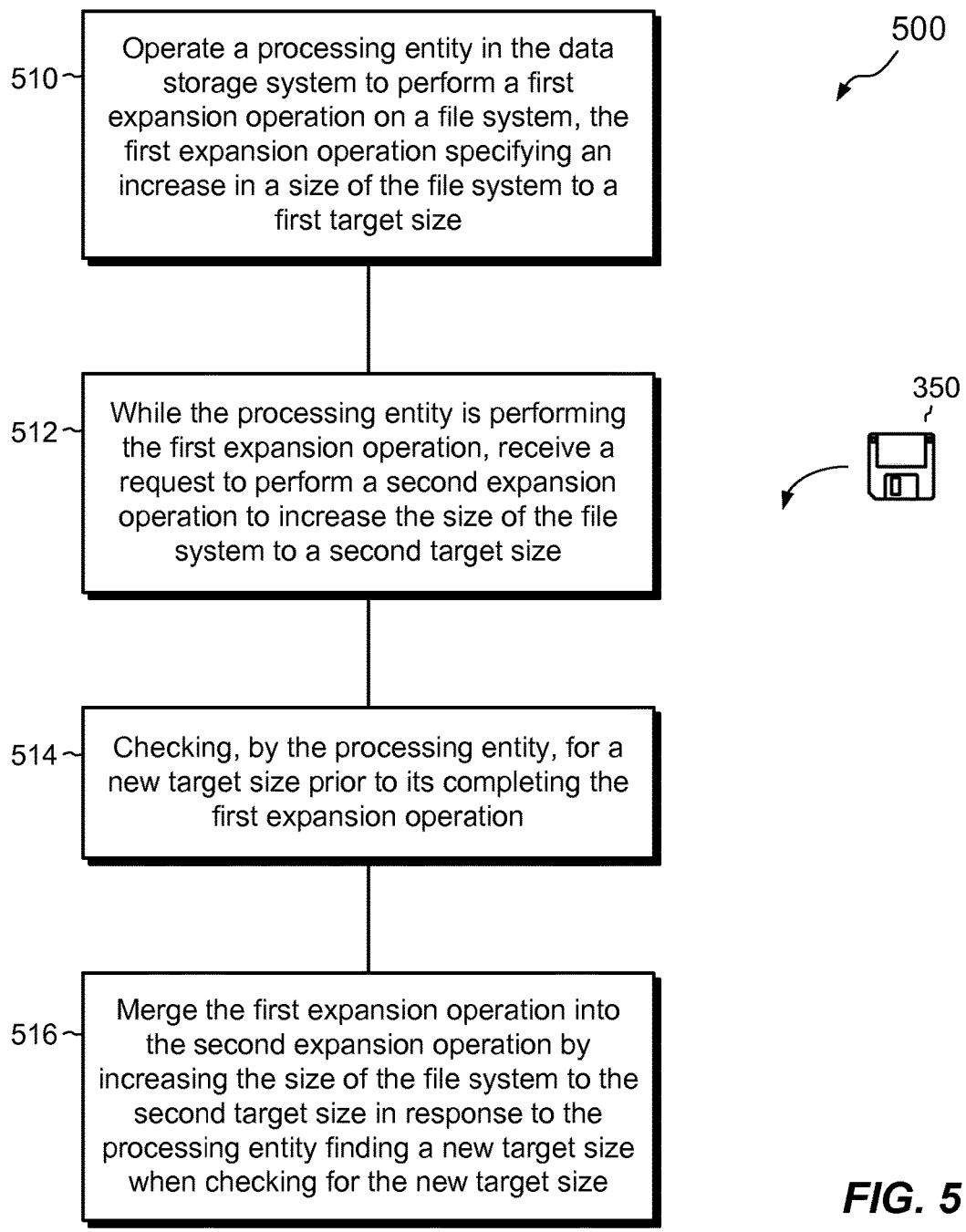
FIG. 5 is a flowchart showing an example process for managing multiple file system expansion operations in a data storage system.

FIG. 5 shows a process 500 for managing multiple file system expansion operations in a data storage system. The process 500 is typically carried out by the software constructs, described in connection with FIGS. 1 and 2, which reside in the memory 130 and are run by the set of processing units 124. The various acts of the process 500 may be ordered in any suitable way. Accordingly, embodiments may be constructed in which acts are performed in orders different from that illustrated, which may include performing some acts simultaneously, even though the acts are shown as sequential in the illustrated embodiments.

At 510, a processing entity is operated in a data storage system to perform a first expansion operation on a file system, the first expansion operation specifying an increase in a size of the file system to a first target size. For example, the PE 160 is operated in the data storage system 116 for performing a first expansion operation on file system 170 to a first target size, stored in TS value 154 (FIG. 1). The first expansion operation may be automatically-initiated, e.g., driven by the space monitor 152 detecting that storage is running low. Alternatively, the first expansion operation may be user-initiated, e.g., driven by an administrator of administrative program 118a, either to enlarge the file system 170 (or 174) or to perform a thin-to-thick conversion on the file system 174.

At 512, while the processing entity is performing the first expansion operation, a request is received to perform a second expansion operation to increase the size of the file system to a second target size. For example, while the PE 160 is already in the process of expanding the file system 170 for the first expansion operation, the data storage system 116 receives a request 117 to perform a user-initiated expansion. The user-initiated expansion specifies or implies a new target size. The data storage system 116 overwrites the TS value 154 with the new target size based on the request 117.

At 514, the processing entity checks for a new target size prior to its completing the first expansion operation. For example, the PE 160, prior to destroying itself or allowing itself to be destroyed by the administrative program 118a, checks the TS value 154 to see whether a new value has been placed there.

At 516, the first expansion operation is merged into the second expansion operation by increasing the size of the file system to the second target size in response to the processing entity finding a new target size when checking for the new target size. For example, the PE 160 merges the two expansion operations by expanding the first file system 170 to the size of the new value placed in the TS value 154 in response to the user-initiated expansion request 117.

An improved technique has been described for managing file system expansions. The technique includes receiving a request 117 to perform a file system expansion, the request specifying an increase in size of a file system 170 (explicitly or implicitly) to a new target size. The request is received while a previous file system expansion is already in progress. The technique includes merging the previous file system expansion into the file system expansion specified by the request 117, to increase the size of the file system 170 to the new target size.

Having described certain embodiments, numerous alternative embodiments or variations can be made. For example, although embodiments have been described for expanding a first file system 170 that stores a file 172 for supporting a second file system 174, this is merely an example. Alternatively, the file system being expanded may be any file system. For example, the file system being expanded may itself be a host-accessible file system.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 350 in FIGS. 3-5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing multiple file system expansion operations in a data storage system, the method comprising:
    operating a processing entity in the data storage system to perform a first expansion operation on a file system, the first expansion operation specifying an increase in a size of the file system to a first target size;
    while the processing entity is performing the first expansion operation, receiving a request to perform a second expansion operation to increase the size of the file system to a second target size;
    checking, by the processing entity, for a new target size prior to its completing the first expansion operation; and
    merging the first expansion operation into the second expansion operation by increasing the size of the file system to the second target size in response to the processing entity finding a new target size when checking for the new target size,
    wherein the file system is a first file system, the first file system being a thickly-provisioned file system for which a predetermined amount of storage is reserved,
    wherein the first the system stores a file that internally realizes a second file system,
    wherein the second file system is a thinly-provisioned file system to which storage is provisioned on demand,
    wherein the first expansion operation is initiated automatically in response to the data storage system detecting that the first file system is running low on available storage space for meeting on-demand storage requirements of the second file system,
    wherein the request to perform the second expansion operation is generated by operation of an administrative program in response to a user action,
    wherein the user action is one of (i) a user-initiated instruction to increase a size of the second file system and (ii) a user-initiated instruction to convert the second file system from a thinly-provisioned file system to a thickly-provisioned the system,
    wherein the processing entity is configured to operate in one of (i) a hidden mode, in which a set of properties of the processing entity are hidden from the administrative program, and (ii) a visible mode, in which the set of properties of the processing entity are visible to the administrative program,
    wherein the processing entity operates in the hidden mode during the first expansion operation, and
    wherein merging the first expansion operation into the second expansion operation includes switching operation of the processing entity from the hidden mode to the visible mode.

2. The method of claim 1,
    wherein, when performing an expansion operation in the hidden mode, the processing entity is configured to destroy itself upon completion of the expansion operation,
    wherein, when performing an expansion operation in the visible mode, the processing entity is configured to be destroyed by the administrative program upon completion of the expansion operation, and
    wherein, when switching operation of the processing entity from the hidden mode to the visible mode, the processing entity reconfigures itself to be destroyed by the administrative program upon completion of the expansion operation.

3. The method of claim 1,
    wherein the file that realizes the second file system is configured for direct mapping, in which sequential logical addresses into the file translate to sequential physical addresses into the first file system via a predetermined mathematical relationship,
    wherein the first file system stores a set of indirect blocks that map logical addresses of the file to corresponding physical addresses, the set of indirect blocks being initially unused for accessing the file but preparing for a transition from direct mapping via the predetermined mathematical relationship to indirect mapping via the set of indirect blocks, and
    wherein a complete expansion operation performed on the first file system includes (i) performing an extending sub-operation, in which additional extents of storage are reserved for the first file system, and (ii) performing a metadata-generating sub-operation, in which indirect blocks are generated to support potential indirect mapping of the file after the first file system is extended.

4. The method of claim 3,
    wherein the request to perform the second expansion operation is received during the first expansion operation while the processing entity is performing an extending sub-operation, and
    wherein merging the first expansion operation into the second expansion operation includes, in order, (i) completing the extending sub-operation to the first target size, (ii) performing an extending sub-operation to the second target size, and (iii) performing a metadata-generating sub-operation on the file after the first file system is extended to the second target size.

5. The method of claim 3,
    wherein the request to perform the second expansion operation is received while the processing entity is performing a metadata-generating sub-operation on the file after the first file system is extended to the first target size, and
    wherein merging the first expansion operation into the second expansion operation includes, in order, (i) canceling the metadata-generating sub-operation on the file after the first file system is extended to the first target size, (ii) performing an extending sub-operation to the second target size, and (iii) performing a metadata-generating sub-operation on the file after the first file system is extended to the second target size.

6. The method of claim 3,
wherein the request to perform the second expansion operation is received while the processing entity is performing a metadata-generating sub-operation on the file after the first file system is extended to the first target size, and
wherein merging the first expansion operation into the second expansion operation includes, in order, (i) completing the metadata-generating sub-operation on the file after the first file system is extended to the first target size, (ii) performing an extending sub-operation to the second target size, and (iii) performing an incremental metadata-generating sub-operation on the file to address additional space in the file after the first system is extended from the first target size to the second target size.

7. A data storage system, comprising control circuitry that includes a set of processing units coupled to memory, the control circuitry constructed and arranged to:
operate a processing entity in the data storage system to perform a first expansion operation on a file system, the first expansion operation specifying an increase in a size of the file system to a first target size;
while the processing entity is performing the first expansion operation, receive a request to perform a second expansion operation to increase the size of the file system to a second target size;
check, by the processing entity, for a new target size prior to its completing the first expansion operation; and
merge the first expansion operation into the second expansion operation by increasing the size of the file system to the second target size in response to the processing entity finding a new target size when checking for the new target size,
wherein the file system is a first file system, the first file system being a thickly-provisioned file system for which a predetermined amount of storage is reserved,
wherein the first file system stores a file that internally realizes a second file system,
wherein the second file system is a thinly-provisioned file system to which storage is provisioned on demand,
wherein the control circuitry is constructed and arranged to initiate the first expansion operation automatically in response to the data storage system detecting that the first file system is running low on available storage space for meeting on-demand storage requirements of the second file system,
wherein control circuitry is constructed and arranged to generate the request to perform the second expansion operation by operation of an administrative program in response to a user action,
wherein the user action is one of (i) a user-initiated instruction to increase a size of the second file system and (ii) a user-initiated instruction to convert the second file system from a thinly-provisioned file system to a thickly-provisioned file system,
wherein the processing entity is configured to operate in one of (i) a hidden mode, in which a set of properties of the processing entity are hidden from the administrative program, and (ii) a visible mode, in which the set of properties of the processing entity are visible to the administrative program,
wherein the processing entity is configured to operate in the hidden mode during the first expansion operation, and
wherein the control circuitry is constructed and arranged to merge the first expansion operation into the second expansion operation is further constructed and arranged to switch operation of the processing entity from the hidden mode to the visible mode.

8. A computer program product including a set of non-transitory, computer-readable media having instructions which, when executed by control circuitry of a data storage system, cause the control circuitry to perform a method for managing multiple file system expansion operations in a data storage system, the method comprising:
operating a processing entity in the data storage system to perform a first expansion operation on a file system, the first expansion operation specifying an increase in a size of the file system to a first target size;
while the processing entity is performing the first expansion operation, receiving a request to perform a second expansion operation to increase the size of the file system to a second target size;
checking, by the processing entity, for a new target size prior to its completing the first expansion operation; and
merging the first expansion operation into the second expansion operation by increasing the size of the file system to the second target size in response to the processing entity finding a new target size when checking for the new target size,
wherein the file system is a first file system, the first file system being a thickly-provisioned file system for which a predetermined amount of storage is reserved,
wherein the first file system stores a file that internally realizes a second file system,
wherein the second file system is a thinly-provisioned file system to which storage is provisioned on demand,
wherein the first expansion operation is initiated automatically in response to the data storage system detecting that the first file system is running low on available storage space for meeting on-demand storage requirements of the second file system,
wherein the request to perform the second expansion operation is generated by operation of an administrative program in response to a user action, and
wherein the user action is one of (i) a user-initiated instruction to increase a size of the second the system and (ii) a user-initiated instruction to convert the second file system from a thinly-provisioned the system to a thickly-provisioned the system
wherein the file that realizes the second file system is configured for direct mapping, in which sequential logical addresses into the file translate to sequential physical addresses into the first file system via a predetermined mathematical relationship,
wherein the first file system stores a set of indirect blocks that map logical addresses of the file to corresponding physical addresses, the set of indirect blocks being initially unused for accessing the file but preparing for a transition from direct mapping via the predetermined mathematical relationship to indirect mapping via the set of indirect blocks, and
wherein a complete expansion operation performed on the first file system includes (i) performing an extending sub-operation, in which additional extents of storage are reserved for the first file system, and (ii) performing a metadata-generating sub-operation, in which indirect blocks are generated to support potential indirect mapping of the file after the first file system is extended.

9. The computer program product of claim 8,
wherein the processing entity is configured to operate in one of (i) a hidden mode, in which a set of properties of the processing entity are hidden from the administrative program, and (ii) a visible mode, in which the set of properties of the processing entity are visible to the administrative program, wherein the processing entity operates in the hidden mode during the first expansion operation, and wherein merging the first expansion operation into the second expansion operation includes switching operation of the processing entity from the hidden mode to the visible mode.

10. The computer program product of claim 9, wherein, when performing an expansion operation in the hidden mode, the processing entity is configured to destroy itself upon completion of the expansion operation, wherein, when performing an expansion operation in the visible mode, the processing entity is configured to be destroyed by the administrative program upon completion of the expansion operation, and wherein, when switching operation of the processing entity from the hidden mode to the visible mode, the processing entity reconfigures itself to be destroyed by the administrative program upon completion of the expansion operation.

11. The computer program product of claim 8, wherein the request to perform the second expansion operation is received during the first expansion operation while the processing entity is performing an extending sub-operation, and wherein merging the first expansion operation into the second expansion operation includes, in order, (i) completing the extending sub-operation to the first target size, (ii) performing an extending sub-operation to the second target size, and (iii) performing a metadata-generating sub-operation on the file after the first file system is extended to the second target size.

* * * * *